United States Patent [19]

Albert

[11] Patent Number: 4,658,175

[45] Date of Patent: Apr. 14, 1987

[54] VIBRATING BEAM FORCE TRANSDUCER WITH A-FRAME BEAM ROOT AND FREQUENCY ADJUSTING MEANS

[75] Inventor: William C. Albert, Parsippany, N.J.

[73] Assignee: The Singer Company-Kearfott Division, Little Falls, N.J.

[21] Appl. No.: 844,479

[22] Filed: Mar. 26, 1986

[51] Int. Cl.[4] .............................................. H01L 41/08
[52] U.S. Cl. ..................................... 310/323; 310/312; 310/338; 310/330; 73/DIG. 4
[58] Field of Search ............... 310/321, 323, 324, 338, 310/312, 367, 368, 361, 25, 330–332; 73/777, 778, 781, 141 R, DIG. 1, DIG. 4, 517 AV, 517 R; 338/2, 47; 357/26

[56] References Cited

U.S. PATENT DOCUMENTS

| | | | |
|---|---|---|---|
| 3,238,789 | 3/1966 | Erdley | 73/517 |
| 3,269,192 | 8/1966 | Southworth et al. | 73/517 |
| 3,399,572 | 9/1968 | Riordan et al. | 73/398 |
| 3,413,859 | 12/1968 | Riordan | 74/5.4 |
| 3,440,888 | 4/1969 | Southworth et al. | 73/517 |
| 3,465,597 | 9/1969 | Riordan et al. | 73/517 |
| 3,470,400 | 9/1969 | Weisbord | 310/323 X |
| 3,479,536 | 11/1969 | Norris | 310/8.5 |
| 3,486,383 | 12/1969 | Riordan | 73/517 |
| 3,505,866 | 4/1970 | Weisbord et al. | 73/141 |
| 3,969,640 | 7/1976 | Staudte | 310/312 |
| 4,104,920 | 8/1978 | Albert et al. | 73/517 AV |
| 4,221,131 | 5/1979 | Albert | 73/517 AV |
| 4,321,500 | 3/1982 | Paros et al. | 310/323 X |
| 4,377,765 | 3/1983 | Kogure et al. | 310/312 |
| 4,445,065 | 4/1984 | Albert | 310/323 X |
| 4,446,394 | 5/1984 | Albert | 310/321 |
| 4,447,753 | 5/1984 | Ochiai | 310/312 |
| 4,544,858 | 10/1985 | Nishiguchi et al. | 310/321 |

OTHER PUBLICATIONS

Serra, Technical Report on the Quartz Resonator Digital Accelerometer, AGARD Conference, May 1968, pp. 487–516.
Albert, Vibrating Quartz Crystal Beam Accelerometer, ISA, 1982, pp. 33–44.
Albert, Force Sensing Using Quartz Crystal Flexure Resonators, IEEE, 1984, pp. 233–239.
Albert et al., Vibrating Beam Accelerometer for Strapdown Applications, IEEE, 1982, pp. 319–322.
Albert, Single Isolator Beam Resonator, Jul. 1978.
Albert, Quartz Crystal Flexure Resonator, 1985.

*Primary Examiner*—Mark O. Budd
*Attorney, Agent, or Firm*—Pennie & Edmonds

[57] ABSTRACT

A vibrating beam force transducer includes a piezoelectric beam structure supported at first and second ends, and an oscillator for inducing a vibration in the piezoelectric beam. To permit adjusting the bias frequency of the beam, an adjustment mass is formed at the center of the beam, the adjustment mass made of piezoelectric material. Part of the adjustment mass can be broken off to adjust the bias frequency. The first and second ends are attached to the a support structure by first and second legs at each end of the beam, the legs having an angle therebetween, thereby forming an A-frame mount.

20 Claims, 9 Drawing Figures

Prior Art

FIG. 6
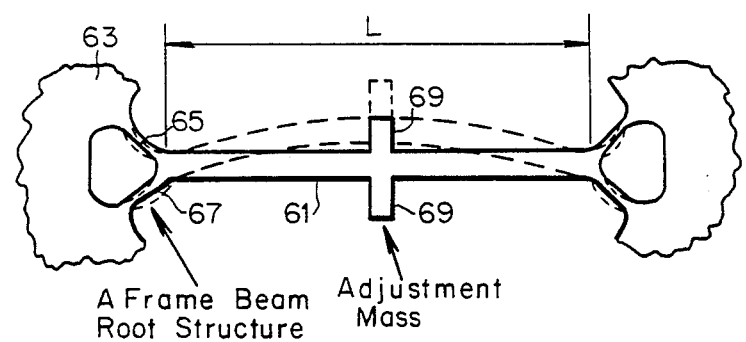
A Frame Beam Root Structure    Adjustment Mass
FIG. 6a
FIG. 7
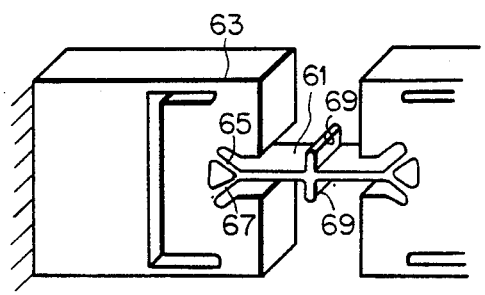

VIBRATING BEAM FORCE TRANSDUCER WITH A-FRAME BEAM ROOT AND FREQUENCY ADJUSTING MEANS

This invention relates to vibrating beam force transducers, in general, and more particularly, to a vibrating beam force transducer which has an A-frame beam root which permits a higher bias frequency turnover temperature.

The application of force sensitive quartz crystal resonators in the instrumentation field is gaining more acceptance year by year. Examples of such applications presently include accelerometers, pressure sensors and load cells. The advantages to be gained using this technology in instrumentation include: an inherent high resolution digital output, high dynamic range, low thermal sensitivity and low power. The unique properties of quartz crystal such as high Q, excellent mechanical and chemical stability, low thermal sensitivity and piezoelectric behavior are characteristics that have long been recognized and utilized by the frequency control industry. It is these very same unique properties that also make quartz crystal such an attractive material for instrumentation applications. It has been demonstrated that vibrating quartz crystal flexure beams exhibit a usable + or −10 percent full-scale frequency change in response to tension and compression forces, respectively, due to "string-like" behavior.

Typical of the type of resonator structures developed in the prior art is that of U.S. Pat. No. 3,470,400. In the type of device disclosed therein there is an isolator structure which isolates beam induced movement and shear reaction from a beam mount. The isolation action prevents the loss of vibration energy and maintains a high Q resonance. The beam vibrations by themselves are sustained by a combination of the piezoelectric properties of the beam material, i.e., quartz crystal, along with excitation from electrodes placed on the beam surface connected to an electronic oscillator. The piezoelectric oscillator action utilized in this device and in the present invention is described in detail in U.S. Pat. No. 3,479,536.

The principle upon which the vibrating flexure beam operates is that, like a taut string, the frequency of the vibrating beam increases with increasing tension. However, unlike the string, a beam will also respond to compression by decreasing its frequency. In addition, a beam does not require a bias tension as does the string. Vibrating beam force transducers have been used to provide vibrating beam accelerometers. In such instances, a matched pair of vibrating beam resonators in a back-to-back configuration is provided. As a result, an input acceleration places one beam in tension and the other in compression. The output of the vibrating beam accelerometer is then taken as the difference frequency. This frequency differencing mechanism results in a greatly reduced net bias and also results in common mode rejection of many error sources such as temperature sensitivity and nonlinearity. The more closely the bias frequency of the two beams can be matched, the lower the net bias and the more effective the common mode rejection of the error sources. The extent to which the bias frequencies can be matched is presently limited by manufacturing tolerances in cutting the beam portion of the resonator structure.

A characteristic of a force transducer of this nature is that the bias frequency is temperature sensitive. The bias frequency is a frequency at which the beam vibrates under a no-load condition. The characteristic of the beam frequency temperature sensitivity is that beam frequency first increases with increasing temperature and then decreases. The point at which the temperature stops increasing and begins decreasing is known as the turnover point, and the temperature at that point as the turnover temperature. At this temperature, the bias frequency is virtually temperature insensitive for small temperature changes. For many instrument applications, it is desirable to have the instrument operating temperature and beam turnover temperature equal to each other. For long, thin beams with a low thickness to length ratio, the turnover temperature is usually too low. It is a property of flexure crystals that the turnover temperature increases with increasing thickness to length ratio. Unfortunately, higher thickness to length ratios result in lower beam force sensitivity. Thus, there is a need for a manner of increasing the thickness to length ratio without lowering the beam force sensitivity or, stated another way, a need to provide a beam configuration that has both a high turnover temperature and a high force sensitivity.

In view of these deficiencies in the prior art, it is an object of the present invention to provide a means to adjust bias frequency.

A further object of the present invention is to provide a beam configuration that has both a high turnover temperature and a high force sensitivity.

SUMMARY OF THE INVENTION

In order to accomplish these objects, the present invention, in the first instance joins the ends of the beam to the isolator mass through an A-frame structure. The A-frame structure provides for high axial stiffness while also being angularly compliant. High angular compliance at the beam root allows for more beam flexure during vibration. This in turn permits an increase in the beam thickness to length ratio. This then allows constructing a beam which has a higher bias frequency turnover temperature.

Secondly, in accordance with the present invention, the center of the beam now includes a centrally located adjustment mass. The purpose of this adjustment mass is to permit small increments to be removed during calibration. Each incremental removal of the mass slightly increases the bias frequency of the vibrating beam and thereby provides an adjustment means so that all beams manufactured can be trimmed to a common nominal bias frequency.

BRIEF DESCRIPTION OF THE DRAWINGS

FIG. 6 is a similar view indicating the manner in which the beam of the present invention is mounted, also showing the use of an adjustment mass.

FIG. 7 is a diagram similar to FIG. 1 illustrating the corresponding resonator of the present invention.

DETAILED DESCRIPTION

Figure 1:
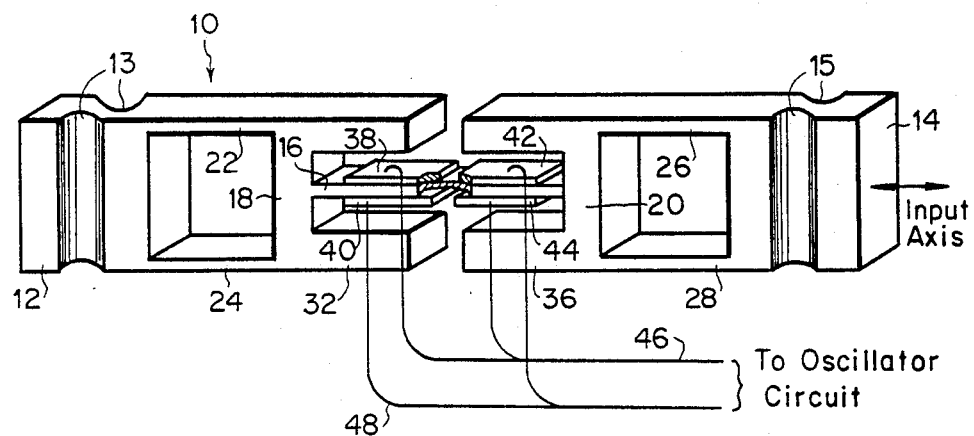
FIG. 1 is a perspective view of a prior art resonator.

FIG. 1 of the drawings illustrates the transducer 10 disclosed in U.S. Pat. No. 3,470,400 which represents generally an entire vibratory beam apparatus including a pair of end mounts 12 and 14 which may be respectively recessed at 13 and 15 to form cross axis hinges and to which supporting members are attached and to which axial forces are applied along the input axis when the unit is used as a force measuring unit as in an accelerometer. The transducer 10 includes a vibratory beam 16 extending between and secured to respective support members 18 and 20.

For decoupling or isolating the beam from mounts 12 and 14 at beam operating frequencies, support members 18 and 20 are connected to respective mounts 12 and 14 by pairs of spaced, thin spring members 22, 24 and 26, 28 and pairs of isolator masses 30, 32 and 34, 36 extending from respective support members 18 and 20 coextensively with a portion of the beam 16. The particular lengths and other dimensions of the masses are correlated with the beam properties. However, in all events, the masses 30 and 34 are axially spaced and masses 32 and 36 are similarly axially spaced. Axial stresses, either tension or compression, applied to the end mounts 12 and 14 are transmitted to the beam 16 through the thin spring members 22 and 24 and 26 and 28.

The beam transducer 10 may be formed from a single block of any suitable material. However, for the sake of clarity, it will be set forth as applied to an apparatus made of quartz or other piezoelectric material to form the particular configuration shown and described, material is cut away by any suitable well-known procedure.

For driving the beam 16 in the body shear mode, pairs of electrodes 38 and 40 are attached to opposite sides of the beam along one axial extent and another pair of electrodes 42 and 44 are attached to opposite sides of the beam along another axial extent. An electronic oscillator, not shown, may provide driving excitation for the beam and leads 46 and 48 from the oscillator are connected to the electrodes. Lead 46 is connected to electrodes 38 and 44, and lead 48 is connected to electrodes 40 and 42. Thus, the electrical excitation applies oppositely directed transverse electric fields through the beam at axially spaced locations. In a manner described in detail in U.S. Pat. No. 3,479,536 issued to Frank Norris and assigned to the present assignee, this described construction and electrical excitation is effective to produce vibration in the beam. It is to be understood, however, that the beam may be driven by other means, the particular one described being only representative and preferred for particular situations. The oscillator circuit also includes circuits for sensing the actual frequency of oscillation which will vary as a function of applied force.

The frequency versus force characteristics of the transducer shown in FIG. 1 is described approximately by the equation:

$$f = f_0 + K_1 T + K_2 T^2 \quad (1)$$

Figure 2A:
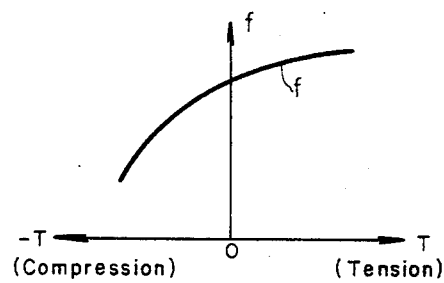
FIG. 2 is a diagram illustrating the relationship between frequency and force in a beam.
Figure 2B:
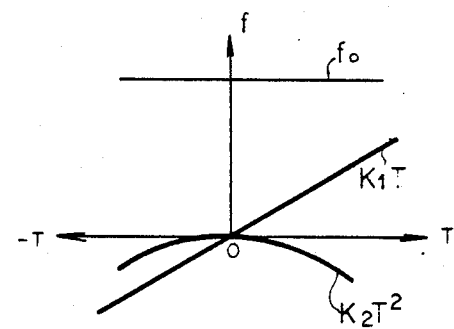
Figure 3:
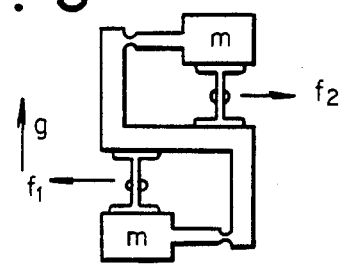
FIG. 3 is a schematic diagram of a vibrating beam accelerometer in accordance with the prior art.

Where:
- f = vibrating beam resonant frequency
- $f_0$ = vibrating beam no load bias frequency
- $K_1$ = the first order frequency-tension sensitivity (linear term)
- $K_2$ = the second order frequency-tension sensitivity (non-linear term)
- T = tension force The frequency versus force characteristics are illustrated in FIG. 2A, while each term of Equation 1 is plotted separately in FIG. 2B. The term containing the $K_2$ coefficient is an undesirable non-linear effect. This undesirable non-linearity may be minimized by using a prior art two-resonator-two-proof mass transducer which puts one beam in tension and the other in compression as shown in FIG. 3. The output of the transducer is taken as the difference frequency of these two individual resonator frequencies. As Equations (2) through (4) indicate, the $K_2$ effects cancel using this design. Note that the tension force T is replaced by its equivalent mg. Also note that a second subscript is used to distinguish the individual resonator coefficients. Resonator 1 will be in tension and therefore:

$$f_1 = f_{01} + K_{11}\, mg + K_{21}\, (mg)^2 \quad (2)$$

Resonator 2 will be in compression and therefore:

$$f_2 = f_{02} + K_{12}\, (-mg) + K_{22}\, (mg)^2 \quad (3)$$

The difference frequency will be $$f_1 - f_2 = (f_{01} - f_{02}) + (K_{11} + K_{12})\, mg + (K_{21} - K_{22})\, (mg)^2 \quad (4)$$

The $K_2$ effects cancel due to the squaring of the $-mg$ term.

The output of the vibrating beam accelerometer of FIG. 3 is thus taken as the difference frequency $f_1$ minus $f_2$. This results in a greatly reduced net bias and in common mode rejection of many error sources such as temperature sensitivity and nonlinearity. The illustrated structure is enclosed and sealed within an outer enclosure. In a device such as that of FIG. 3, the more closely the bias frequencies of the two beams can be matched, the lower the net bias and the more effective the common mode rejection of error sources. The extent to which bias frequencies can be matched is presently limited by manufacturing tolerances in cutting the beam portion of the resonator structure.

Figure 4:
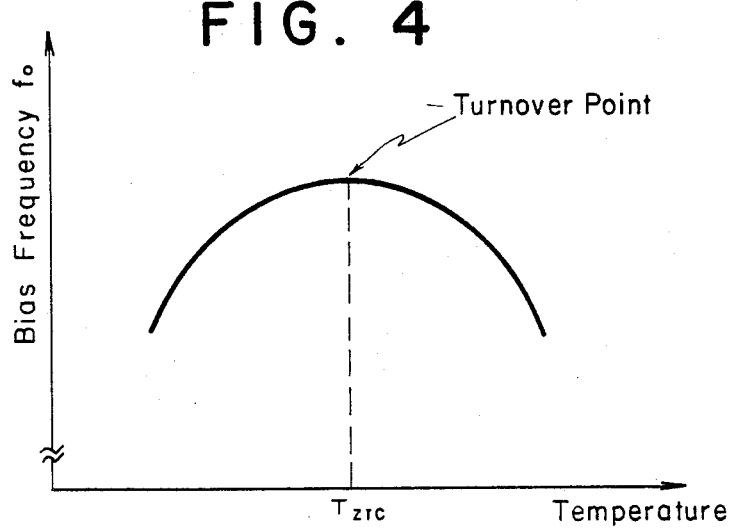
FIG. 4 is a diagram illustrating the relationship between bias frequency and temperature.

Another characteristic of the vibrating beam is illustrated by FIG. 4 which is a diagram of bias frequency versus temperature. Bias frequency is the frequency at which the beam vibrates under a no-load (T=0) condition. The bias frequency temperature sensitivity has the characteristic illustrated in FIG. 4. The turnover temperature ($T_{ZTC}$ where ZTC denotes the point of zero temperature coefficient) is an operating temperature at which the beam bias frequency becomes virtually temperature insensitive for small temperature changes.

Figure 5:
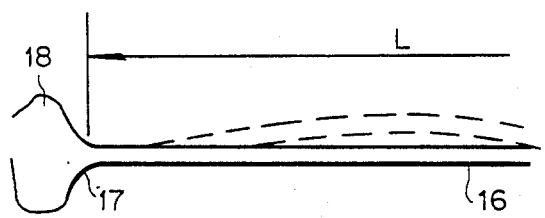
FIG. 5 is a diagram illustrating the way in which the beam of the prior art was mounted.

FIG. 5 illustrates the beam portion of the resonator shown in FIG. 1.

The prior art beam design configuration is simply a prismal beam with built-in (fixed-fixed) end conditions, i.e., end 17 is fixed to isolator structure 18.

The mathematical relationship that describes the beam bias frequency ($f_0$) in terms of it's physical properties, geometry of FIG. 5 and boundary conditions is given by Equation 5.

$$f_o = a_o \frac{t}{L^2} \sqrt{\frac{E}{\rho}}\ .$$

Where E is the elastic modulus, is the material density and $a_0$ is a constant. L $\rho$ is the beam length and t its thickness.

For the fixed-fixed beam of FIG. 5 which is made of quartz crystal, the $a_o$ term and the physical property terms (E and $\rho$) are fixed, therefore, it is the t and L dimensions which are controlled by design to give the desired bias frequency.

The two beam parameters that are controlled during manufacture are also the thickness and length with thickness being the most critical. The manufacturing process used allows the thickness to be controlled to a tolerance of about + or −0.0001 inches which is about + or −2% of the nominal 0.005 inch thickness. Since as Equation 5 indicates, the bias frequency is directly proportional to thickness, a frequency tolerance of plus or minus 2% will also result.

In an accelerometer application, the resonators are used in matched pairs where the bias frequencies are matched to about + or −0.15%. Therefore, to achieve this match, a large number of resonators must be made so that pairs matched to 0.15% can be selected from the overall resonator population manufactured.

Equation 6 is the mathematical expression which describes the first order relationship of frequency change ($\Delta f$) to applied force (T).

$$\frac{f}{f_o} = a_1 \frac{L^2}{Ebt^3} T \quad (6)$$

Where $a_1$ is a constant; b is the beam width and other symbols are as previously defined.

Note that the frequency change is positive for tension (+T) and minus for compression (−T). An examination of Equation 6 reveals that a beam with a high thickness-to-length ratio (relatively short and thick, needed for a high $T_{ZTC}$) will result in a decreased force sensitivity since the term L to the second power is in the numerator while the term t to the third power is in the denominator. Therefore, the beam geometry which gives a high turnover temperature will give a low force frequency-sensitivity.

FIG. 6 is a diagram illustrating the beam of the present invention, and FIG. 7 a perspective view of a resonator structure using this beam. As illustrated in FIGS. 6 and 7, unlike the beam 16 of the prior art, the beam 61 of the present invention is attached at its ends by means of an A-frame beam root structure which has legs 65 and 67 attaching it to the isolator structure 63. In addition, at the center of the beam on each side thereof, is an adjustment mass 69. FIG. 6a is a cross section through the beam showing its width b and thickness t. The use of the A-frame structure provides high axial stiffness also be angularly compliant. This allows more beam flexure during vibrations.

The operation of the adjustment mass will now be described. It can be shown that the addition of the adjustment mass 69 modifies Equation 5 so that the mathematical expression for bias frequency now includes a second term as described approximately by Equation 7.

$$f_o = a_o \frac{t}{L^2} \sqrt{\frac{E}{\rho(1 + 2.5 m_A/m_B)}}.$$

Where $m_A/m_B$ is the mass ratio of the adjustment mass to the beam mass.

An examination of Equation 7 reveals that decreasing $m_A$ in small increments will increase the bias frequency in small increments. It has been experimentally verified that frequency changes as fine as 0.04% can be achieved by removing small increments of this central mass. Note that the resonators in question are made of quartz crystal which is a brittle material and therefore small increments of removal of adjustment mass 69 can be achieved by simply breaking them off. The frequency adjustment means has a great advantage since the adjustment can be made to a resonator that has been fully processed up through electrode plating and test. At manufacture, a resonator which now includes the central mass is purposely made with a lower than nominal desired $f_0$ bias frequency. The calibration procedure is to first measure the initial bias frequency and then incrementally remove small pieces of the central mass until the desired nominal bias frequency is achieved.

The operation of the A-frame will now be described. As previously stated, the A-frame allows for more flexure at the beam root. It can be analytically demonstrated that more flexure at the beam root effectively increases the magnitude of the $a_1$, coefficient of Equation 2. As an example, $a_1$ for a fixed beam is 0.148 while $a_1$ for a pinned-pinned beam is 0.608. Note that a pinned-pinned condition, i.e., a fully angularly complaint condition, would be achieved if the angular compliance of the A-frame could be made infinite. Although this cannot be achieved practically, pinned-pinned like conditions can be approached so that an $a_1$ coefficient greater than the fixed-fixed but less than the pinned-pinned can be practically achieved. Experimental results indicate a practical $a_1$ of about 0.4 is being achieved.

An examination of Equation 6 will reveal that for a given frequency-force sensitivity, an increased $a_1$ coefficient will permit a reduction in beam length L and/or and increase in beam thickness t for an overall increase in the beam geometry thickness-to-length (t/L) ratio. Therefore, the addition of the A-frame beam root is an improvement over the prior art in that an acceptable frequency-force sensitivity can be achieved with a beam geometry that has a greater thickness-to-length ratio, and therefore, a beam which has a higher bias frequency turnover temperature $T(_{ZTC})$ The advantages of the present invention over the prior art are as follows:

1. The addition of the adjustment mass provides for a fine bias frequency adjustment means whereby the beam bias frequency can now be trimmed to + or −0.04%. The prior art, manufacturing tolerances resulted in a + or −2% bias frequency spread. This adjustment means permits all resonators to be trimmed to a common bias frequency which is desirable for matching purposes in the accelerometer application for which these resonators are often used. It is an additional advantage that the adjustment means will permit the bias frequency to be adjusted on a resonator that has been fully processed up through plating and test.
2. The addition of the angularly complaint A-frame to the beam root results in a beam design which has a more favorable combination of frequency-force sensitivity and turnover temperature.

Although these two features give particularly good results when combined, it is noted that each can be used separately.

What is claimed is:

1. In a vibrating beam force transducer comprising a piezoelectric beam structure having first and second ends, and means for inducing a vibration in the piezoelectric beam, the improvement comprising:
   an adjustment mass formed at the center of said beam, said adjustment mass made up of said piezoelectric material, whereby parts of said adjustment mass can be broken off to adjust the bias frequency of said vibrating beam; and
   further including first and second legs at each end of said beam for directly mounting said beam to a support structure or mass.

2. Apparatus according to claim 1, wherein said adjustment mass comprises first and second portions extending perpendicularly from opposite sides of the center of said beam structure.

3. Apparatus according to claim 2, wherein said vibrating beam has a rectangular cross section with a width greater than its thickness and wherein said adjustment mass portions comprise thin rectangular portions extending perpendicularly from both of the wider sides of said rectangular beam.

4. In a vibrating beam force transducer comprising a piezoelectric beam structure having first and second ends and means for inducing a vibration in the piezoelectric beam, the improvement comprising:
   an adjustment mass formed at the center of said beam, said adjustment mass made up of said piezoelectric material, whereby parts of said adjustment mass can be broken off to adjust the bias frequency of said vibrating beam;
   wherein said first and second ends are attached to a support structure, and further including first and second legs at each end of said beam mounting said beam to said support structure, said legs forming an angle therebetween to thereby form an A-frame mount.

5. Apparatus according to claim 4, and further including an isolator structure between each end of said vibrating beam and said support structure.

6. Apparatus according to claim 5, wherein said transducer is symmetrical.

7. Apparatus according to claim 6 wherein all of said transducer is made of a single piece of piezoelectric material.

8. In a vibrating beam force transducer comprising: a piezoelectric beam structure supported at first and second ends; and means for inducing a vibration in the piezoelectric beam; said first and second ends attached to a support structure, the improvement comprising first and second legs at each end of said beam mounting said beam to said support structure, said legs forming an angle therebetween to thereby form an A-frame mount.

9. Apparatus according to claim 7, and further including an isolator structure between each end of said vibrating beam and said support structure.

10. Apparatus according to claim 8, wherein said transducer is symmetrical.

11. Apparatus according to claim 10 wherein all of said transducer is made of a single piece of piezoelectric material.

12. Apparatus according to claim 4, wherein said adjustment mass comprises first and second portions extending perpendicularly from opposite sides of the center of said beam structure.

13. Apparatus according to claim 12, wherein said vibrating beam has a rectangular cross section with a width greater than its thickness and wherein said adjustment mass portions comprise thin rectangular portions extending perpendicularly from both of the wider sides of said rectangular beam.

14. Apparatus according to claim 13, wherein said first and second legs at each end of said beam form an angle therebetween.

15. Apparatus according to claim 1, wherein said transducer is symmetrical and made of a single piece of piezoelectric material.

16. In a vibrating beam force transducer comprising a piezoelectric beam structure having first and second ends, a pair of isolator means, and means for inducing a vibration in the piezoelectric beam, the improvement comprising:
   an adjustment mass formed at the center of said beam, said adjustment mass made up of said piezoelectric material, whereby parts of said adjustment mass can be broken off to adjust the bias of frequency of said vibrating beam; and
   further including first and second legs at each end of said beam for mounting said beam to said isolator means.

17. Apparatus according to claim 16, wherein said adjustment mass comprises first and second portions extending perpendicularly from opposite sides of the center of said beam structure.

18. Apparatus according to claim 17, wherein said vibrating beam has a rectangular cross section with a width greater than its thickness and wherein said adjustment mass portions comprises thin rectangular portions extending perpendicularly from both of the wider sides of said rectangular beam.

19. Apparatus according to claim 18, wherein said first and second legs at each end of said beam form an angle therebetween.

20. Apparatus according to claim 19, wherein said transducer is symmetrical and made of a single piece of piezoelectric material.

* * * * *